United States Patent [19]
O'Neil et al.

[11] Patent Number: 5,199,401
[45] Date of Patent: Apr. 6, 1993

[54] ENGINE THROTTLE SERVOACTUATOR CONTROL SYSTEM

[75] Inventors: Walter K. O'Neil, Birmingham; Donald R. Haefner, Oak Park; Wayne E. Klindt, Sterling Heights; Mark L. Leonard, Canton; Daniel R. Parks, Farmington; Don K. St. John, Livonia, all of Mich.

[73] Assignee: Eaton Corporation, Cleveland, Ohio

[21] Appl. No.: 780,178

[22] Filed: Oct. 21, 1991

[51] Int. Cl.$^5$ .................. F02D 11/10; B60K 28/16
[52] U.S. Cl. .................. 123/342; 123/399; 180/197; 318/560
[58] Field of Search ........... 123/342, 352, 361, 399, 123/400; 180/178, 179, 197; 318/560, 663

[56] References Cited

U.S. PATENT DOCUMENTS

| | | | |
|---|---|---|---|
| 4,389,990 | 6/1983 | Murray | 123/353 |
| 4,601,271 | 7/1986 | Ejiri et al. | 123/399 X |
| 4,640,248 | 2/1987 | Stoltman | 123/399 |
| 4,656,407 | 4/1987 | Burney | 123/352 X |
| 4,671,235 | 6/1987 | Hosaka | 123/399 X |
| 4,763,623 | 8/1988 | Sasaki | 123/339 |
| 4,791,902 | 12/1988 | Ishikawa et al. | 123/399 |
| 4,831,985 | 5/1989 | Mabee et al. | 123/399 |
| 4,838,225 | 6/1989 | Steffes | 123/342 |
| 4,883,037 | 11/1989 | Mabee et al. | 123/399 |
| 4,892,071 | 1/1990 | Asayama | 123/399 X |
| 4,940,109 | 7/1990 | Preston et al. | 123/342 |
| 4,950,965 | 8/1990 | Kenny et al. | 123/352 X |
| 5,062,404 | 11/1991 | Scotson et al. | 123/399 |
| 5,115,396 | 5/1992 | Keegan | 123/399 X |

Primary Examiner—Tony M. Argenbright
Attorney, Agent, or Firm—L. H. Uthoff, Jr.

[57] ABSTRACT

A control system for an engine throttle valve actuator uses an actuator position feedback loop with a compensation factor which applies a reverse voltage having an amplitude based on actuator momentum to a DC motor to effectuate an electrical braking action to achieve high speed response with positional accuracy. A separate position limiting feedback loop is used to prevent excessive actuator excursions. The engine throttle valve is controlled to a selected position by using a throttle valve position feedback loop and a compensation factor to provide a feedback signal to a summing junction.

19 Claims, 4 Drawing Sheets

ENGINE THROTTLE SERVOACTUATOR CONTROL SYSTEM

BACKGROUND OF THE INVENTION

This invention relates to an engine throttle actuator control system as part of a vehicle traction control system, and more specifically, to an engine throttle actuator where the position of the engine throttle is controlled primarily by an input from the vehicle driver which is then reduced by intervention of an engine throttle actuator whose operation is controlled by the vehicle traction control system and the feedback control system of the present invention.

DESCRIPTION OF THE PRIOR ART

There presently exists both open and closed loop controlled throttle electromechanical actuator devices for intervening in the mechanical actuation of a vehicle throttle normally directly controlled by driver input from an accelerator pedal typically connected to the throttle by a tension cable. Recent traction control systems have included electronically controlled actuator mechanisms that serve to reduce the opening of the engine throttle independent of the driver's input in response to a position signal generated by an electronic control unit to effectuate a reduction in engine power upon loss of vehicle traction. Under certain operating conditions, one aspect of a vehicle traction control system is to provide an automatic reduction of the opening of the engine throttle so as to reduce engine power to assist in maintaining vehicle control.

One method of accomplishing this result is to provide a pivoted bellcrank or lever that can be transversely moved relative to the accelerator pedal so as to reduce the engine throttle position upon activation of the device upon command from an electronic control unit. These actuators have operated in an open loop manner where the position of the actuator depends on the force applied to a motor and the input electrical power. In some other advanced systems, the electronic control unit operates to position the actuator in a continuous mode by monitoring the output of wheel speed sensors and making real time adjustments in the electrical power to the actuator in an appropriate manner to reduce or limit engine power by closing the throttle without regard to the position of the throttle actuator device.

Such existing single traction control loop control approaches do not allow the relationship between driver's accelerator pedal and the intervention input to be tailored to provide the desired characteristics and "feel" for the driver. Also, the single traction control loop, replete with many time lags and resiliences including induction, combustion, inertia and driveline wrap-up, is required to perform all the requirements of the system in a single algorithm.

In order to provide traction control, which ideally requires the almost instantaneous reduction of engine power through closure of the throttle valve, it is necessary to incorporate an actuator type device that has a very quick response. U.S. Pat. No. 4,950,965, the disclosure of which is expressly incorporated herein by reference, discloses such a throttle control actuator of the type that uses a pivoted lever riding on a lead screw which is rotated by the action of a high speed DC motor. This type of mechanism has a particularly fast response time where the pivoted lever can be moved from one extreme of the lead screw to the other extreme in approximately 150 milliseconds. To maintain a quick response time, it is necessary to run the motor at a high rate of speed continuously until the desired position of the mechanism is obtained. This requires a sophisticated position feedback control system with the proper compensation for stability.

Control systems to date have been inadequate to provide quick response with accurate position and stability when a high speed DC motor driven cable intervention device is used to reduce the engine throttle position for use with a traction control system on a vehicle. Due to the high speed nature of the motor, the momentum of the motor and mechanism causes control problems. Simple reduction or elimination of the DC electrical current to the motor is an inadequate method of control when fast response times are desired, since when the current to the motor is simply reduced or eliminated, the momentum of the motor and mechanism causes the pivoted lever to travel past the requested position. One solution to this problem is to simply reduce or eliminate electrical power to the motor much earlier than the requested position allowing the lever to coast and hopefully stop at the proper position on the lead screw. The problem with this is that, depending on the positional history of the mechanism, the speed and momentum of the motor mechanism will change just prior to the point of desired position and an accurate time for power reduction and elimination is difficult to calculate. Another problem with this approach is that the response time of the mechanism is increased due to the early reduction or elimination of motor power thereby compromising the effectiveness of the traction control system.

Another type of mechanical mechanism to axially position a lever fulcrum is disclosed in application U.S. Ser. No. 07/736,659 filed Jul. 26, 1991, now U.S. Pat. No. 5,161,504, entitled "Dual Mode Electrical Servoactuator" by which would also show a performance gain if an advanced control system could be applied.

Another type of mechanical mechanism is disclosed in U.S. Pat. No. 4,940,109, the disclosure of which is hereby expressly incorporated by reference, which cooperates with the present invention to control the force experienced by the driver at the accelerator pedal.

SUMMARY OF THE INVENTION

The present invention is an electronic means of providing controlled electrical power to an electric motor driven engine throttle position control mechanism to allow high speed response with accurate positioning. Position feedback control loops inside the outer traction control loop, are used with feedback compensation and/or a limiting value to modify the input command signal from a vehicle electronic control unit which can be either an intervention actuator position command or a throttle limit position command so that the engine throttle responds in a fashion to reduce the vehicle engine power according to a traction control algorithm.

By using the present invention, relationships between accelerator input combined with traction loop input to throttle position output can be exactly and rapidly tailored to provide the characteristics and driver feel desired which may vary with type of vehicle. What is desired for a sedan may not be the same as that for a high performance car. The slower main traction loop is left free to process the wheel speed signals and to take traction control action without having to remain excessively busy at the actuator control level.

Due to the high speed nature of the mechanism, it is necessary to provide a special control feedback feature that brakes the DC motor by reversing the motor applied voltage to provide accurate positioning with quick response. This technique minimizes the response time of the actuator so that the engine throttle position is controlled as fast as possible thereby enhancing the effectiveness of the traction control algorithm. By using the control techniques of the present invention, it is possible to minimize the response time while retaining accurate position and control accuracy required with such systems.

Due to the mechanical nature of the actuators described in U.S. Pat. No. 4,950,965 and pending application U.S. Ser. No. 07/736,659 filed Jul. 26, 1991, now U.S. Pat. No. 5,161,504, when excessive intervention is attempted, the cable running from the accelerator pedal to the actuator and/or the cable running from the actuator to the throttle can go slack and the force at the accelerator pedal changes dramatically which are both undesirable from an operational viewpoint. By using the control techniques of the present invention, the position of the actuator can be controlled to eliminate this slack cable and/or accelerator pedal force problem.

Some traction control algorithms output a control signal that sets the desired position of the throttle control actuator whereas in other traction control strategies, the output is in the nature of the desired engine throttle position limit. One embodiment of the present invention accepts an actuator position control signal from the traction electronic control unit and, using the feedback control loop, positions the actuator in accordance with that command. In the second embodiment, the actuator responds to a throttle position command signal from the traction electronic control unit and positions the actuator so as to limit throttle opening to the position command signal.

One provision of the present invention is to provide a closed loop position control system for an engine throttle actuator where the speed of response is maximized by using reverse voltage braking of a DC motor.

Another provision of the present invention is to provide a position feedback control system to an engine throttle actuator where the actuator movement is limited so as to eliminate excessive intervention travel into an undesirable region.

Still another provision of the present invention is to provide a closed loop feedback control for an engine throttle actuator where the position command of the engine throttle valve is used to determine the position of the actuator.

DESCRIPTION OF THE PREFERRED EMBODIMENT

Figure 1:
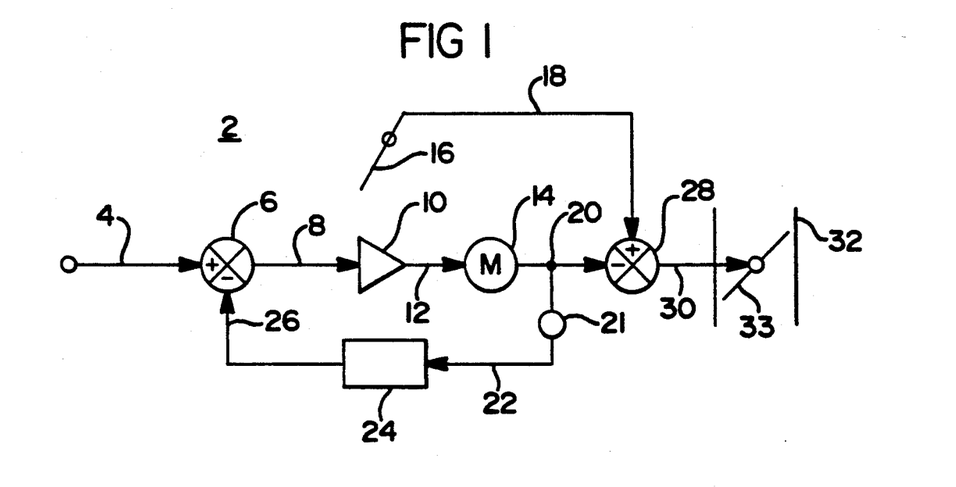
FIG. 1 is a schematic view of an embodiment of the present invention utilizing a single position feedback control loop from the DC motor powered actuator.

FIG. 1 shows a schematic view of the present invention where a DC motor powered actuator (2) is connected both to an accelerator pedal (16) by way of an accelerator throttle cable (18) and then to an intervention output cable (30) which is connected to and which controls the engine throttle plate (33). Under normal operation, the engine throttle plate (33) moves in proportion to the position of the driver's foot on accelerator pedal (16) through action of accelerator throttle cable (18) and intervention output cable (30). Upon the happening of a particular event, such as the excess spinning of the drive wheels of the vehicle, an electronic traction control unit issues an actuator position command signal (4) that is fed to an input summing junction (6) which generates a summing junction output (8) which is fed to a signal power amplifier (10) where the amplifier output (12) powers a DC motor (14) which drives the actuator mechanism (20). Without further control, such as the control system of the present invention, the servoactuator mechanism would travel to and hold at an unspecified position upon termination of the actuator position command signal (4).

The actuator output cable (30) is attached at one end to the actuator mechanism (20) and at a second end to the throttle valve (33) which resides in the throttle housing (32) which controls the airflow into an engine. The position of the actuator mechanism (20) is measured by an actuator position sensor (21) whose position sensor output (22) is fed to a mathematical function known as the actuator position feedback dynamic compensator (24) where it is mathematically manipulated and in turn, generates an actuator position feedback signal (26) which is then fed back to the input summing junction (6) where it is subtracted from the actuator position command signal (4). A different dynamic compensation equation is used depending on the direction of the actuator mechanism (20) travel.

The effect is that by utilizing the feedback control system of the present invention, the position of the actuator mechanism (20) is accurately positionally controlled according to the actuator position command signal (4) by the feedback loop based on the actuator position sensor (21) so that the DC motor (14) is powered until the desired position is reached and then the input power is removed until a new command signal is generated. The DC motor (14) is powered at a high level by the signal power amplifier (10) until nearly reaching the desired position as set by the actuator position command signal (4) and then the current is rapidly decreased and can reverse to provide a braking effect to further slow the speed of the actuator mechanism (20) as it nears the desired position. In this manner, the speed of response of the throttle actuator to a command signal (4) is maximized while providing for very accurate positioning.

Figure 2:
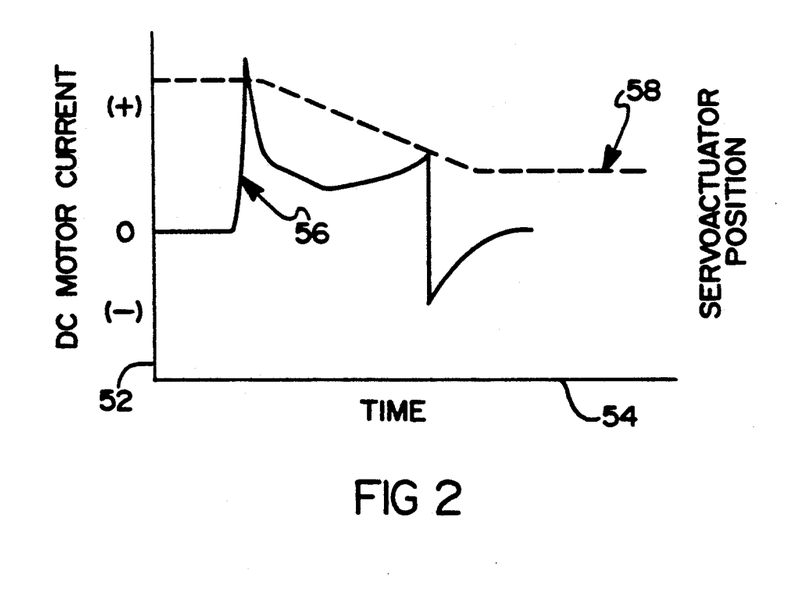
FIG. 2 is a graph showing the DC Motor Current and the Servoactuator Position versus Time of the present invention.

FIG. 2 shows a graph of the actuator DC motor current (56) and actuator position (58) versus time. The DC motor current (56) is plotted on the ordinate (52) while time is on the abscissa (54). The DC motor current (52) range spans both negative and positive values as illustrated by the current time history as shown by the DC motor current (56) which starts out near zero level. The actuator position is shown on the same graph as dashed line (58) where the actuator starts at a position and then with time gradually moves to a second position and stabilizes out at that second position.

Upon signal from the electronic control unit, an actuator position command signal (4) is inputted into the throttle actuator control system (2). At that point DC motor current (56) increases in value from zero in a positive direction and the actuator position changes as illustrated by the break in the dashed line actuator position (58). As motor speed increases, the DC motor current falls to a nominal positive level where it continues for some period of time until the actuator position nears the final stabilized desired value as determined by the actuator position command signal (4) whose amplitude is decreasing due to the actuator position feedback signal (26). At this point, negative voltage is inputted into the DC motor (14) and the DC motor current reverses direction. Thus, the motor wants to reverse direction of rotation so as to dramatically oppose the motion of the actuator mechanism (20) which is being affected by the momentum of both the DC motor (14) and the actuator mechanism (20). To account for the momentum effect of the DC motor (14) and the actuator mechanism (20), the actuator position feedback compensator (24) calculates a momentum term based on the time derivative of position and applies that as a part of the compensator which mathematically manipulates the actuator position feedback signal so that the actuator mechanism (20) is rapidly braked as it approaches the desired position. After the reversed bias DC motor current is applied, the voltage is gradually increased to zero so that the actuator mechanism (20) stops at the desired position as shown by the final value of the actuator position (58) in FIG. 2.

A typical equation showing the actuator position feedback compensator is shown below which includes the DC motor (14) and actuator mechanism (20) momentum calculation which results in a actuator position feedback signal (26).

$$E_{co} = G_{PWM}A_{po} + G_e e_o - M_t O_o$$

$A_{po}$ = The actual current cable intervention angular position as measured from the actuator position sensor (21).
$A_{p1} = A_{po}$ measured 1 millisecond prior in time.
$D_{po}$ = Actuator position command signal (4).
$e_o = D_{po} - A_{po}$ = current position error.
$O_o = A_{po} - A_{p1}$ = current timed displacement.
$E_{co}$ = Actuator position feedback signal (26).

$G_e$ = Error gain (experimentally determined—separate value for moving into intervention and moving out of intervention).
$M_t$ = Timed momentum gain (separate value for moving into intervention and moving out of intervention).
$G_{PWM}$ = Pulse Width Modulated Signal Gain (separate value for moving into intervention and moving out of intervention).

Figure 3:
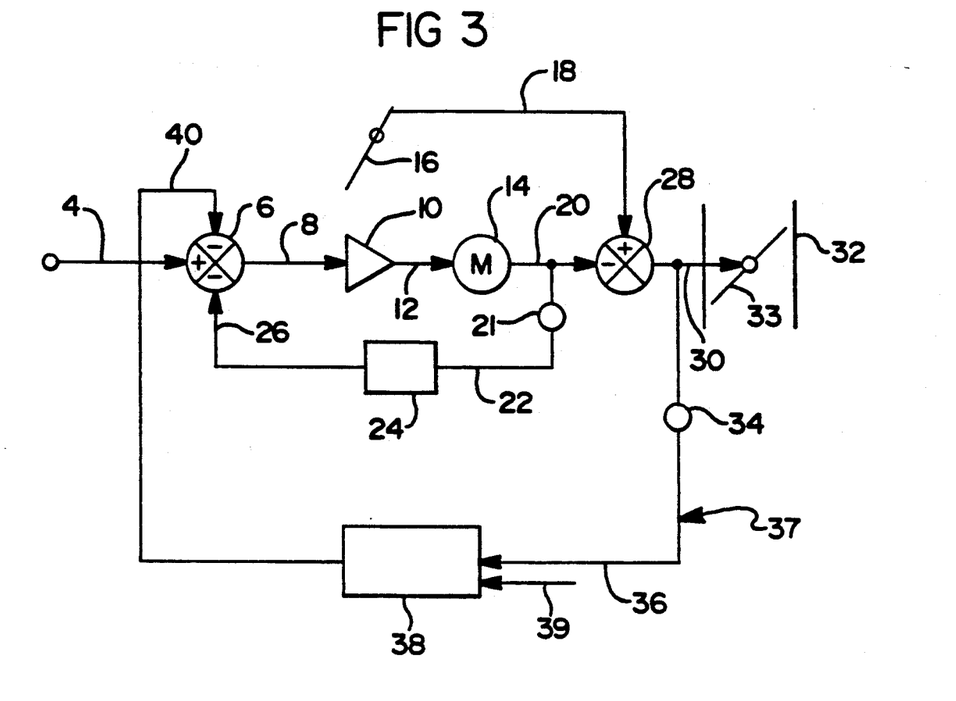
FIG. 3 is a schematic view of an embodiment of the present invention utilizing a second feedback control loop based on the position of the throttle plate and serving as a travel limit to the actuator and the feedback control loop shown in FIG. 1.

FIG. 3 shows the throttle actuator control system (2) identical to that shown in FIG. 1 except that a second control feedback loop (37) has been added where a throttle valve position sensor (34) is added to the actuator output cable (30) feeding a valve position sensor output (36) into a second feedback loop with a valve position limit feedback block (38) which calculates the maximum position of the actuator mechanism (20) relative to a throttle zero position reference (39) to prevent excessive intervention excursion of the actuator. If the actuator moves in an attempt to close the throttle valve (33) beyond its closing point, the accelerator throttle cable (18) or the output actuator output cable (30) can become slack which is not functionally significant but undesirable. The valve position limited feedback signal (40) is fed to the input summing junction (6) and subtracted from the actuator position command signal (4) to prevent the actuator mechanism (20) from moving further than required for idle throttle position.

Figure 4:
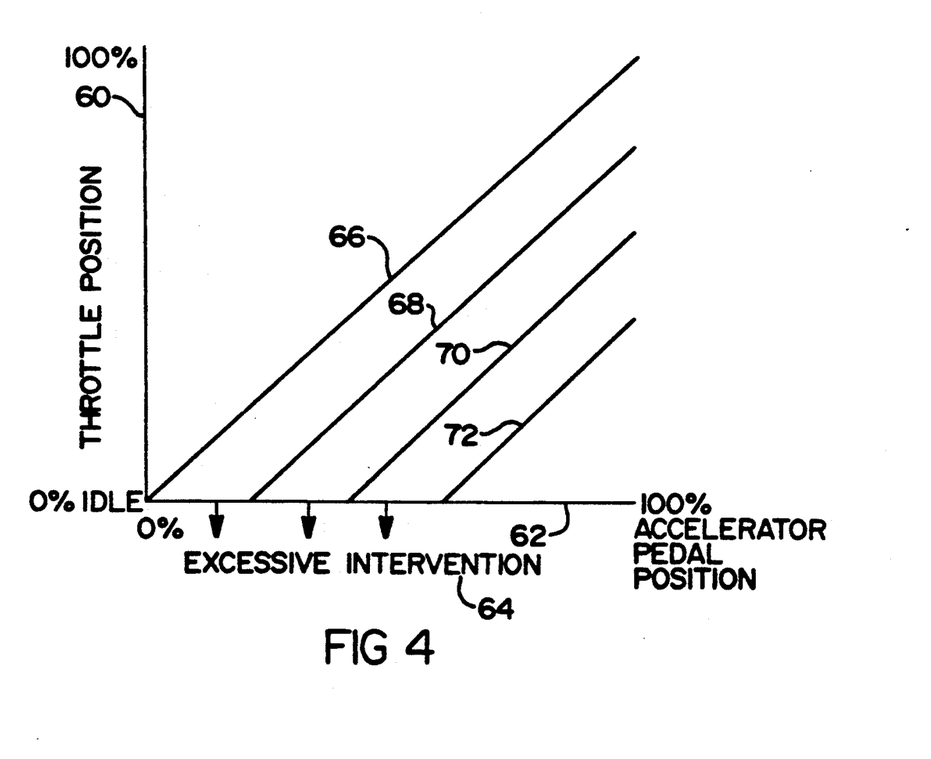
FIG. 4 is a graph showing the Throttle Position versus Accelerator Position for various Servoactuator Positions of the present invention.

The result of the second feedback loop (37) to prevent excursion of the device into the excessive intervention zone (64) and is illustrated by FIG. 4 where the throttle position (60) is shown on the ordinate and versus the accelerator pedal position (62) on the abscissa. The excessive intervention zone (64) is in the area that would mechanically require the throttle position (60) to be lower than fully closed to maintain a no slack cable condition which corresponds to various pedal positions (62) or depending on the extent of travel of the actuator mechanism (20). Line 66 of FIG. 4 illustrates the relationship between the throttle position (60) and the pedal position (62) when the actuator is in a standard position so that full travel of the accelerator pedal (16) results in full travel of the throttle valve (33) allowing full airflow into the engine. Line 68 illustrates the throttle position (60) relationship to accelerator pedal position (62) when the actuator mechanism (20) has traveled to approximately 20% of its travel and results in a 20% decrease in engine throttle valve (33) position for a given accelerator pedal position (62) and the throttle valve (33) maximum opening is limited to 80% of its full travel capability. Likewise, line 70 illustrates the relationship between pedal position (62) and throttle position (60) when the actuator mechanism (20) has traveled to approximately 40% of its travel and the throttle valve (33) maximum opening is limited to 60% of its full travel capability. Line 72 illustrates in a similar fashion the relationship between accelerator pedal (62) and throttle position (60) when the actuator mechanism (20) has traveled to approximately 60% of its potential travel and the throttle valve (33) maximum opening is limited to 40% of its full travel capability.

Thus, referring to line 70 of FIG. 4, if the pedal is either reduced in position while the actuator mechanism (20) remains stationary, the throttle position can be at a minimum and the attempt to further reduce throttle position results in a slack accelerator throttle cable (18) or a slack actuator output cable (30) which is undesirable from an operational standpoint. As explained supra, the high gain valve position limit feedback (38) prevents operation in the excess intervention zone (64) from occurring by subtracting the output of the high gain valve position limit feedback (30) at the input summing junction (6) from the actuator position command signal (4).

Figure 5:
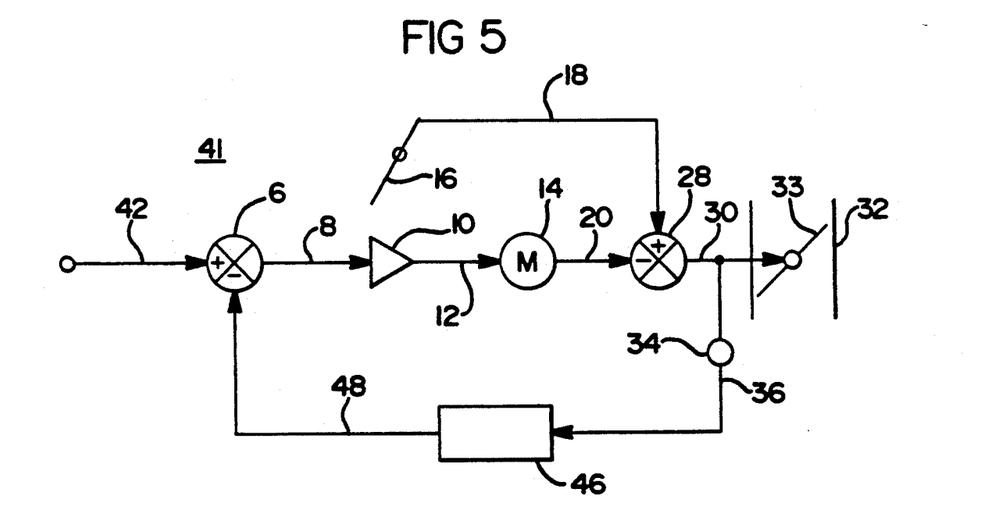
FIG. 5 is a schematic view of an embodiment of the present invention having a single feedback control loop based on the position of the engine throttle plate.

FIG. 5 shows an alternate embodiment of the throttle actuator control system (2) where the system input is now a throttle valve position limit signal (42) which is generated by the traction control algorithm software in the vehicle electronic control unit. The throttle valve position limit signal (42) is routed to the input summing junction (6) afterwhich the summing junction output (8) is inputted to the signal power servo amplifier (10) which in turn generates a power amplifier output (12) which is inputted to DC motor (14) and drives the actuator mechanism (20) to the extent and in direction corresponding to the amplifier output (12). The actuator mechanism (20) moves so as to subtract from the input from the accelerator pedal (16) through accelerator pedal cable (18) which results in movement of a actuator output cable (30) which is attached to the throttle plate (33) which resides in a throttle assembly (32). The position output of the actuator output cable (30) is sensed by the throttle valve position sensor (34) where the valve position sensor output (36) is routed to a valve position feedback compensator (46) whose function is to mathematically manipulate the output of the throttle valve position sensor so as to limit the operation of the actuator control mechanism (20) so that the throttle valve (33) does not open beyond the throttle valve position limit signal (42) as commanded by the throttle plate position limit signal (42). This is accomplished as shown in FIG. 5 by subtracting the valve position feedback signal (48) from the throttle valve position limit command signal (42) at the input summing junction (6).

Thus, FIG. 5 illustrates a schematic of a throttle actuator control system (41) which serves to control the maximum position of throttle plate (33) so as to reduce engine power when required by the traction control system when the vehicle is in certain operational modes. This differs from the throttle actuator control system disclosed in FIG. 1 and FIG. 3 where the traction control algorithm in the electronic control unit generates the actuator position command signal (4) rather than the maximum throttle plate position.

The vehicle electronic control unit generates a throttle plate position limit signal (42) which is added at the input summing junction (6) whose output (8) is an input to the signal amplifier (10) whose output (12) powers the DC motor (14) whose mechanical mechanism output (20) is subtracted from the accelerator cable (18) travel. The throttle plate (33) position is measured by throttle valve position sensor (34) where the valve position sensor output (36) is inputted to the valve position feedback compensator (46) where the valve position output (36) is mathematically manipulated to yield a valve position feedback compensator signal (48) that is routed to and subtracted from the throttle valve position limit signal (42). In this manner, the position of the engine throttle valve (33) is controlled to the position command from the traction control program.

Figure 6:
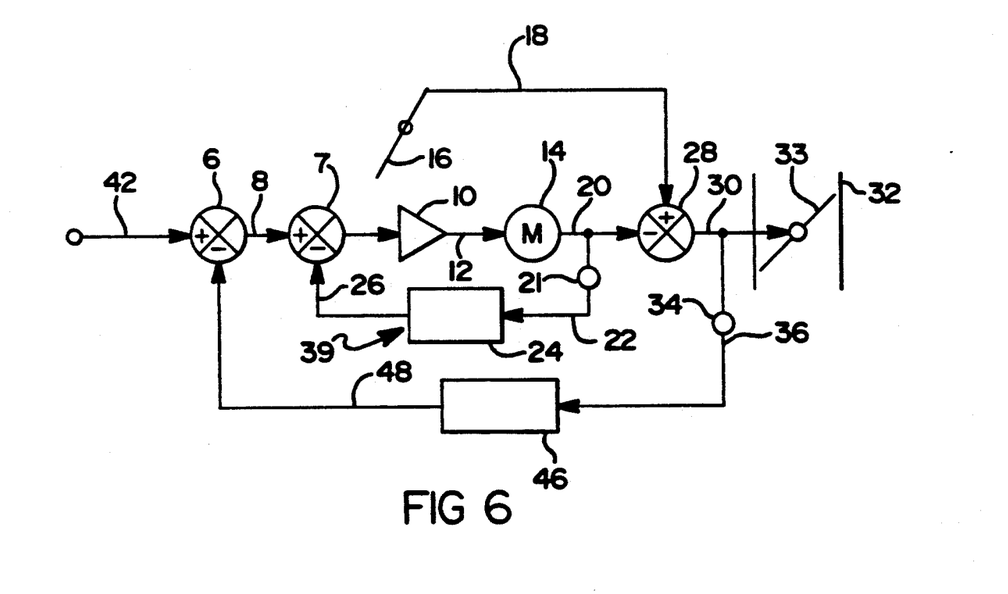
FIG. 6 is a schematic view of an embodiment of the present invention utilizing a second feedback control loop based on the position of the DC motor powered actuator and the feedback control loop shown in FIG. 5.

FIG. 6 illustrates an alternate embodiment of the present invention where the second feedback loop (39) based on throttle valve position is added to the system schematically shown in FIG. 5. The function of this second feedback loop is to stabilize the position of the actuator through a actuator position feedback control loop similar to that disclosed in FIG. 1. In a like manner to that described supra, the position of the actuator mechanism (20) is measured by a actuator position sensor (21) whose output (22) is routed to a actuator feedback compensator (24) where its value mathematically manipulated so as to generate a actuator position feedback signal (26) which is subtracted from the summing junction output (8) in a second input summing junction (7) where it is then routed to the signal power amplifier (10) in a like manner to that described in previous figures. In this manner, further utilization of the actuator is effectuated while still limiting the opening of the throttle valve (33) for control of the maximum engine power.

Figure 7:
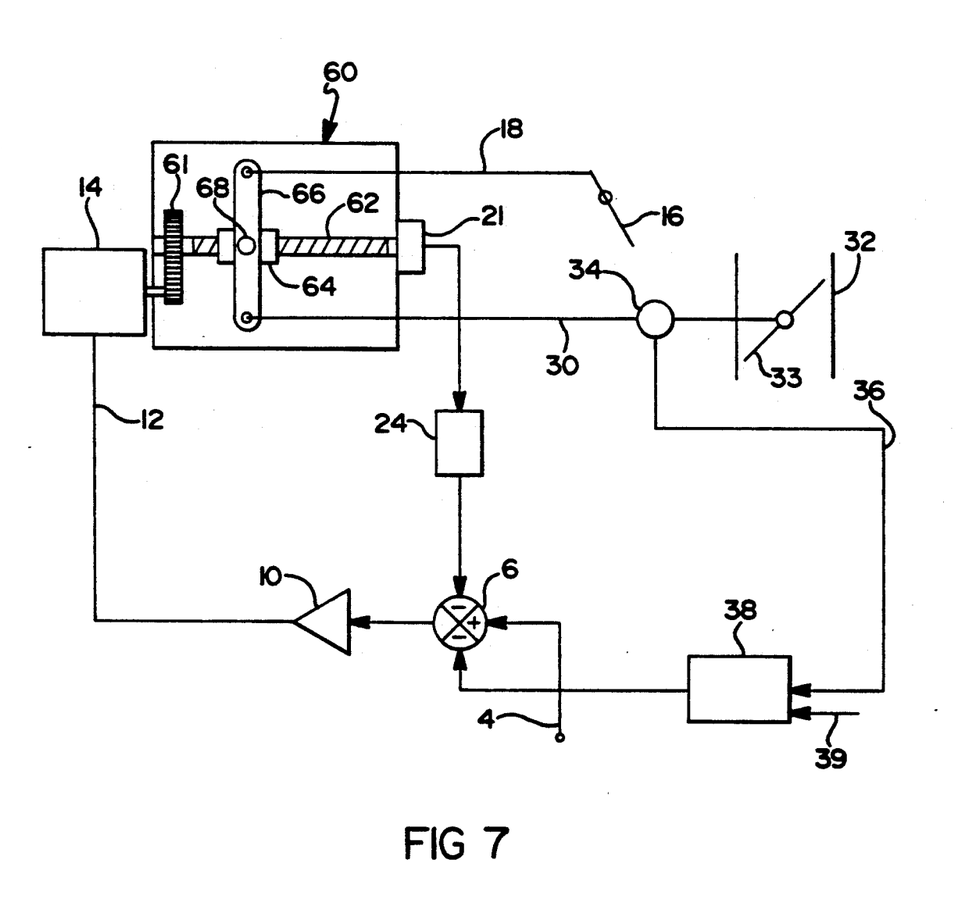
FIG. 7 is a schematic view of an embodiment of the present invention utilizing a position control system based on the feedback signal from the throttle actuator and the engine throttle similar to that shown in FIG. 4 applied to a throttle actuator of the type employing a movable fulcrum member having a lever arm pivoted thereon.

FIG. 7 is a schematic view of another embodiment of the present invention similar to that disclosed in FIG. 3. In FIG. 7 a specific embodiment of a throttle actuator (60) is shown where the actuator (60) is driven by a DC motor (14) through a gear reduction drive gearing (61) which turns a lead screw (62). The lead screw (62) is mated to a fulcrum member (64) which transversely moves along the lead screw (62) by engaging threads. The fulcrum member (64) includes a fulcrum level pivot upon which is mounted a lever arm (66) which is free to move rotationally about the fulcrum lever pivot (68) so that movement of the accelerator pedal (16) and the accelerator throttle cable (18) results in a rotation of the lever arm (66) about the fulcrum lever pivot (68) whose position relative to the accelerator throttle cable (18) is determined by the position of the fulcrum member (64) as it follows the threads of the lead screw (62). Rotation of the lever arm (66) determines the axial travel of the actuator output cable (30) which in turn is attached to/and opens the throttle valve (33) residing in the throttle assembly (32).

As the lead screw (62) is rotated by the DC motor (14) in a direction to move the fulcrum member (64) toward the accelerator throttle cable (18), the mechanical relationship between the accelerator throttle cable (18) to the servoactuator output cable (30) is changed so that the opening of the throttle valve (33) is inversely proportional to the amount that the fulcrum lever pivot (68) is moved axially toward the accelerator throttle cable (18) assuming a constant accelerator pedal (16) position.

The rotation position of the lead screw (62) is measured by the actuator position sensor (21) whose output is routed into the actuator position dynamic feedback compensator (24) whose output is then routed to the input summing junction (6) and subtracted from the actuator position command signal (4) whose output is then routed to the signal power amplifier (10) which supplies a power signal in a forward or reverse direction by its amplifier output (12) to the DC motor (14). The throttle valve (33) rotational position is measured by the throttle valve position sensor (34) whose output (36) is routed to the valve limit feedback compensator (38) whose output is then conducted to the summing junction (6) and also subtracts from an actuator position command signal (4). As explained supra, the valve position limit feedback (38) prevents the actuator (60) from assuming a position that would result in slack accelerator pedal or actuator cable (18 and 30 respectively).

The description of the embodiments of the present invention as disclosed herein by way of example only. Although embodiments of the present invention are shown which employ analog electronics, the present invention can be equally well implemented using digital electronics with appropriate software. Various modifications and rearrangement of components contemplated without departing from the spirit in the scope of the invention as hereafter claimed.

What is claimed is:

1. A method of controlling the position of a throttle control servoactuator comprising:
   providing a servoactuator position command signal;
   providing a throttle control servoactuator means having a DC motor drive mechanism;
   providing a servoactuator position signal;
   providing a servoactuator position feedback control means;
   calculating a servoactuator momentum value based on the time derivative of said servoactuator position signal;
   calculating a position error term by subtracting said servoactuator position signal from said position command signal; and
   supplying a DC power signal to said motor with an amplitude proportional to said position error term reduced by said servoactuator momentum value.

2. The method of controlling the position of a throttle control servoactuator of claim 1 further comprising:
   determining a required direction of travel of said throttle control servoactuator;
   applying a forward feedback compensation term if said servoactuator is moving in a forward direction and a reverse feedback compensation term to said servoactuator feedback control if said servoactuator is moving in a reverse direction.

3. The method of controlling the position of a throttle control servoactuator of claim 1 further comprising:
   providing a throttle position signal;
   providing a limit feedback loop outside of said servoactuator position feedback control;
   subtracting said limit feedback loop from said position command signal based on said servoactuator position signal and said throttle position signal.

4. The method of controlling the position of a throttle control servoactuator of claim 1 wherein said DC power signal is allowed to reverse direction as said position error term decreases in amplitude.

5. The method of controlling the position of a throttle control servoactuator of claim 4 wherein an amplitude of said DC power signal is proportional to said servoactuator momentum value and a direction of movement.

6. A method of controlling the position of an engine throttle comprising:
   providing a throttle control servoactuator means having a DC motor driven mechanism;
   providing a throttle position limit command signal as an input to said throttle control servoactuator;
   providing a servoactuator throttle position feedback control means;
   providing a throttle position signal;
   generating an error signal by comparing said throttle position limit command signal with said throttle position signal;
   substracting said error signal from said throttle position limit command signal and inputting a result to said throttle control servoactuator.

7. The method of controlling an engine throttle position of claim 6 further comprising:
   providing a servoactuator position signal;
   substracting said servoactuator position signal from said throttle position limit command signal to produce a control signal;
   inputting said control signal into said throttle control servoactuator.

8. A servoactuator for changing the position of an engine throttle blade comprising:
   housing means;
   a fulcrum member movably disposed on said housing means and guided thereon for movement along a predetermined line of action;
   lever means pivotally mounted on said fulcrum member, said lever means adapted for receiving and transmitting throttle action, and reaction forces, thereto on opposite sides of said pivot, pivotal mount and in the direction of said line of action;
   electric actuator means mounted on said housing means and responsive to an electrical control signal to provide bi-directional rotation of an output member;
   linkage means operatively connecting said output member for effecting said movement of said fulcrum member;
   fulcrum position sensing means disposed on said housing means and operative to sense movement of said linkage means;
   a feedback control signal generated by applying a compensation factor to said fulcrum position sensing means;
   a servoactuator position command signal; and
   input summing junction means, adding said servoactuator position command signal and subtracting said feedback control signal and outputting a resultant thereof to said electric actuator means.

9. The servoactuator for changing the position of an engine throttle blade of claim 8, wherein said electric actuator means comprises a DC electric motor and an operational amplifier having as an input said resultant and an output connected to said DC electric motor.

10. The servoactuator for changing the position of an engine throttle blade of claim 9, wherein said operational amplifier reverses the sign of said output as the value of said fulcrum position sensing means approaches the value of said feedback control signal.

11. The servoactuator for changing the position of an engine throttle blade of claim 8, wherein said servoactuator position command signal is generated by an electronic control unit to effectuate a traction control algorithm.

12. The servoactuator for changing the position of an engine throttle blade of claim 8, wherein said compensation factor is of one form when said fulcrum member is moving or about to be moved in one direction along said predetermined line of action and of a second form when said fulcrum member is moving or about to be moved in an opposite direction.

13. The servoactuator for changing the position of an engine throttle blade of claim 9, wherein said compensation factor is adapted according to a servoactuator momentum value.

14. The servoactuator for changing the position of an engine throttle blade of claim 8, wherein said fulcrum position sensing means includes an electrical contact wiper on said linkage means and a plurality of spaced resistive strips contained within said fulcrum position sensing means.

15. A servoactuator for changing the position of an engine throttle blade comprising:
   housing means;

a fulcrum member movably disposed on said housing means and guided thereon for movement along a predetermined line of action;

lever means pivotally mounted on said fulcrum member, said lever means adapted for receiving and transmitting throttle action, and reaction forces, thereto on opposite sides of said pivot, pivotal mount and in the direction of said line of action;

electric actuator means mounted on said housing means and responsive to an electrical control signal to provide bi-directional rotation of an output member;

linkage means operatively connecting said output member for effecting said movement of said fulcrum member;

fulcrum position sensing means disposed on said housing means and operative to sense movement of said linkage means;

a servoactuator position command signal;

throttle plate position sensing means;

a first feedback control signal generated by applying a first compensation factor to said fulcrum position;

a second feedback control signal generated by applying a second compensation factor to said throttle plate position;

input summing junction means, adding said servoactuator position command signal and subtracting said first feedback control signal and subtracting said second feedback control signal and outputting a resultant thereof to said electric actuator means.

16. The servoactuator for changing the position of an engine throttle blade of claim 15, wherein said second feedback control signal includes a throttle position limit term whose valve is determined by said throttle plate position and said fulcrum position to prevent servoactuator travel into a region of excessive intervention.

17. A servoactuator for controlling the position of an engine throttle blade comprising:

housing means;

a fulcrum member movably disposed on said housing means and guided thereon for movement along a predetermined line of action;

lever means pivotally mounted on said fulcrum member, said lever means adapted for receiving and transmitting throttle action, and reaction forces, thereto on opposite sides of said pivot, pivotal mount and in the direction of said line of action;

electric actuator means mounted on said housing means and responsive to an electrical control signal to provide bi-directional rotation of an output member;

linkage means operatively connecting said output member for effecting said movement of said fulcrum member;

fulcrum position sensing means disposed on said housing means and operative to sense movement of said linkage means;

a throttle blade position command signal;

throttle plate position sensing means;

a first feedback control signal generated by applying a compensation factor to said throttle plate position;

a second feedback control signal generated by applying a compensation factor to said fulcrum position; and a first input summing junction means operative to add said throttle blade position command signal and subtract said throttle plate position and output the resultant; and a second input summing junction means operative to add said first input summing junction means output and subtract said second feedback control signal and to output a resultant thereof to said electric actuator means.

18. A servoactuator for controlling the position of an engine throttle blade comprising:

housing means;

a fulcrum member movably disposed on said housing means and guided thereon for movement along a predetermined line of action;

lever means pivotally mounted on said fulcrum member, said lever means adapted for receiving and transmitting throttle action, and reaction forces, thereto on opposite sides of said pivot, pivotal mount and in the direction of said line of action;

electric actuator means mounted on said housing means and responsive to an electrical control signal to provide bi-directional rotation of an output member;

linkage means operatively connecting said output member for effecting said movement of said fulcrum member;

fulcrum position sensing means disposed on said housing means and operative to sense movement of said linkage means;

a throttle blade position command signal;

throttle plate position sensing means;

a feedback control signal generated by applying a compensation factor to said throttle plate position; and input summing junction means, operative to add said throttle blade position command signal and subtract said throttle plate position and to output a resultant thereof to said electric actuator means.

19. The servoactuator for controlling the position of an engine throttle blade of claim 18, wherein said compensation factor is adjusted according to the speed of operation of said electric actuator means.

* * * * *